United States Patent [19]

Billingham et al.

[11] Patent Number: 5,752,538
[45] Date of Patent: May 19, 1998

[54] LIQUID DISTRIBUTOR FOR PACKED COLUMNS

[75] Inventors: John Fredric Billingham, Tonawanda; Michael James Lockett, Grand Island; Damian Uzoma Ogbonna, Kenmore, all of N.Y.

[73] Assignee: Praxair Technology, Inc., Danbury, Conn.

[21] Appl. No.: 571,788

[22] Filed: Dec. 13, 1995

[51] Int. Cl.$^6$ ............................................. E03B 1/00
[52] U.S. Cl. ........................... 137/1; 137/561 A; 261/97
[58] Field of Search .................. 261/97; 137/561 A, 137/1, 14

[56] References Cited

U.S. PATENT DOCUMENTS

| | | | |
|---|---|---|---|
| 3,281,133 | 10/1966 | Eckert | 261/97 |
| 3,524,731 | 8/1970 | Effron et al. | 261/97 |
| 4,267,978 | 5/1981 | Manteufel | 239/193 |
| 4,472,325 | 9/1984 | Robbins | 261/97 |
| 4,816,191 | 3/1989 | Berven et al. | 261/97 |
| 5,013,407 | 5/1991 | Nocca et al. | 261/97 |
| 5,026,459 | 6/1991 | Quang et al. | 261/97 |
| 5,051,214 | 9/1991 | Chen et al. | 261/97 |
| 5,132,055 | 7/1992 | Alleaume et al. | 261/97 |
| 5,145,612 | 9/1992 | Reay et al. | 261/79.2 |
| 5,158,713 | 10/1992 | Ghelfi et al. | 261/97 |
| 5,240,652 | 8/1993 | Taylor et al. | 267/97 |

OTHER PUBLICATIONS

J.A. Bonilla, "Don't Neglect Liquid Distributors", Chemical Engineering Progress, Mar., 1993, pp. 47–61.

*Primary Examiner*—A. Michael Chambers
*Attorney, Agent, or Firm*—Bernard R. Lau

[57] ABSTRACT

A baffle which extends over the cross section of a liquid-vapor contacting column and is suspended above a distributor floor. The baffle, having an open space, converges and mixes liquid flow falling from a liquid-vapor contacting zone above, before dispersing it to the distributor below. The open space of the baffle, may also be fitted with a mixing device for further enhancement of liquid mixing.

16 Claims, 3 Drawing Sheets

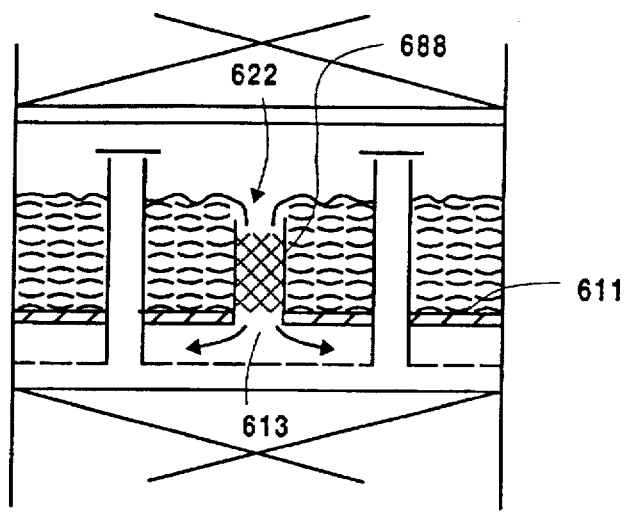
Fig. 6
Fig. 7
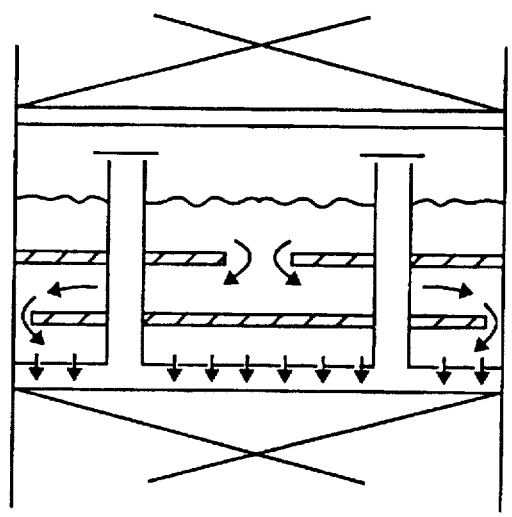
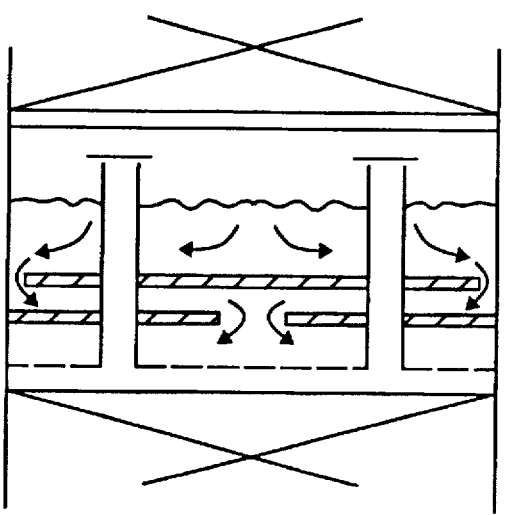
Fig. 8

LIQUID DISTRIBUTOR FOR PACKED COLUMNS

FIELD OF THE INVENTION

This invention relates to a fluid distributor for mass transfer columns, and more particularly, to liquid distributors for a gas-liquid contact column with at least one baffle which enhances liquid mixing.

BACKGROUND OF THE INVENTION

Mass transfer columns such as liquid-vapor contact columns are employed for example in distillation, absorption and stripping procedures. Generally, a column contains one or more liquid-vapor contacting zones which can comprise packing material to effect efficient contact between the upwardly flowing gas and the downwardly flowing liquid.

Efficient liquid distribution to a packed bed requires a uniform composition and flow profile to be delivered over the entire packing surface. A collector/distributor arrangement is typically employed to achieve such liquid distribution. If this is not achieved then the distributor arrangement is essentially causing liquid maldistribution and the packing will not perform optimally. Such liquid maldistribution results in a greater height requirement of the packed bed necessary to effect a given amount of mass transfer.

Where the packing is arranged so that there is more than one liquid-vapor contacting zone or bed, the liquid typically is redistributed between the packing of one bed and that of another bed. Effective redistribution accomplishes: 1) mixing the liquid to smooth composition profiles that may have developed in the bed above and 2) providing good initial distribution to the bed below. A collector/distributor combination is normally used for redistribution in a packed column. A collector is a device that captures liquid from the packing above, and from possible feed locations, and directs the liquid to a small number of downcomers. These downcomers direct the liquid onto the distributor. The distributor contains a plurality of orifices through which liquid streams fall onto the packing. However, the use of a collector increases column height and thus increases capital cost.

There are several types of liquid distributors for packed columns. Of these types, the pan distributor may be used as a liquid collector. This is because 1) the gas risers through which the upwardly flowing vapor passes are covered by "hats" which deflect liquid falling on top of them and 2) the distributor floor is sealingly closed to the interior of the column shell. The net effect is that all liquid is collected in the liquid pool held up on the pan, and cannot fall directly through to the liquid-vapor contacting zone below. Thus, some mixing of liquid occurs before it leaves the distributor. Where a liquid feed is introduced to a column, that feed may be sparged directly onto the distributor.

Pan distributor arrangements without a collector are significantly cheaper than when a collector is used because the cost of making and installing the collector is removed along with the additional column height required to house it. However, there are potential performance drawbacks associated with eliminating a collector. As previously stated, a primary function of a distributor is to deliver a liquid of uniform composition. If the liquid falling onto the distributor has a composition profile, then without a collector, there is no guarantee of uniform mixing on the distributor pan itself. Also, there is a concern about distribution quality due to inertial effects associated with liquid impinging directly onto the liquid held up on the distributor, particularly with an external liquid feed as may occur at a feed point. This may cause variation in the flow through the perforations in the distributor floor, thus decreasing the distribution quality.

The prior art has attempted to compensate for these potential inefficiencies, when a distributor is employed without a collector, by a variety of distributor constructions. For example, U.S. Pat. No. 5,132,055 discloses a distributor with U-shaped sections encompassing liquid spaces and a peripheral channel communicating with the liquid spaces. An embodiment of this reference discloses having 2 plates mounted in each liquid space. Other variations of this embodiment are also disclosed. However, all of the arrangements disclosed in this reference are specific to a distributor having channels with vertical walls and the plates are mounted within each individual channel. Each channel runs in the same direction across the distributor and therefore does not effectively promote mixing in every direction. Even though the channels are connected by a peripheral channel this is still insufficient to accomplish uniform mixing across the entire cross section of the distributor.

U.S. Pat. No. 5,240,652 discloses the use of a liquid collector and liquid distributor where the distributor contains a trough below the level of the vapor risers. One embodiment of the '652 reference adds a deflector plate between the trough and the distributor. However, the mixing of the liquid for proper redistribution still requires the use of the collector in this reference and thus would still incur the additional cost for the required column height to accommodate the collector.

Another reference, U.S. Pat. No. 5,158,713 teaches a distributor arrangement for the mixing of liquid without the need for a collector. In this particular arrangement two or more duct-like troughs are placed above the liquid level in the distributor. The troughs are constructed with one closed end and at least one opening at the other end. Liquid that flows along the trough flows through the opening to the liquid accumulated above the distributor. The reference does not provide for mixing of the liquid that directly impinges on the distributor through the spaces between troughs. Further, there is no flow dampening of drops impinging directly on the distributor. The device is complex and may require additional column height to allow for the troughs to be suspended above the liquid level and thus, could also be costly.

Mixing of vapor in a column is the focus of U.S. Pat. No. 5,145,612. In this reference, mixing is achieved by limiting the number of vapor risers in the distributor and adding a mixing element within the riser. The device disclosed in the reference provides a more uniform vapor concentration profile to the exchange bed above the distributor tray, but does not address the problem of improper mixing for liquid redistribution.

OBJECTS OF THE INVENTION

It is therefore an object of the invention to provide uniform redistribution of liquid to a distributor between two liquid-vapor contacting zones without the use of a collector.

It is a further object of the invention to provide uniform redistribution of liquid by using a cost effective, simply constructed baffle suspended above a distributor.

A still further object of this invention to provide such uniform redistribution of liquid by the use of a baffle suspended above the floor of the distributor which causes a liquid flow to converge and mix as it flows through an open space in the baffle and disperses below the baffle.

SUMMARY OF THE INVENTION

This invention comprises a baffle suspended above a distributor in a liquid-vapor contacting column, wherein a liquid flow converges and mixes as it flows through an open space in the baffle and is then dispersed to the distributor below.

In a preferred embodiment of the invention, the open space in the baffle is a centrally located circular hole fitted with a mixing device to enhance mixing.

BRIEF DESCRIPTION OF THE DRAWINGS

Other objects, features and advantages will occur to those skilled in the art from the following description of preferred embodiments and accompanying drawings, in which:

FIG. 6 is a diagram of yet another embodiment of the invention with a weir attached to a baffle having a central circular open space;

FIG. 7 shows an embodiment of the invention wherein two baffles are used, a baffle with peripheral open space on the bottom and a baffle with central open space on the top; and FIG. 8 also shows an embodiment with two baffles, a baffle with central open space at the bottom and a baffle with peripheral open space at the top.

DETAILED DESCRIPTION OF THE INVENTION

Figure 1:
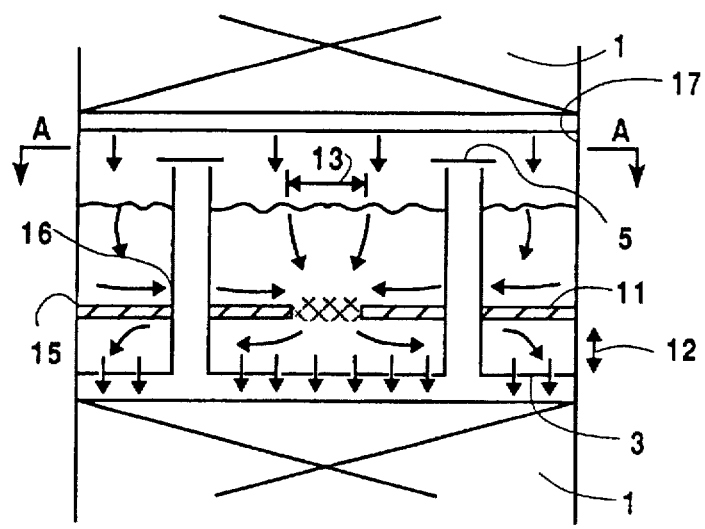
FIG. 1 is a schematic side view of an embodiment of the invention utilizing a distributor with cylindrical gas risers which protrude through a baffle having a centrally located circular open space.

This invention may be accomplished by positioning a baffle between a distributor and a liquid-vapor contacting zone. The baffle is suspended at a sufficient height from the distributor floor to allow flow velocities, as the liquid flow expands underneath the baffle, to be such that the associated head required to drive the flow is small relative to the liquid held up on the distributor. This promotes uniform flow across the distributor and thus, prevents the flowrate of liquid, leaving each perforation in the distributor floor, from varying with distance from the open space in the baffle.

The maximum height above the distributor for the location of the baffle is limited to the maximum height of the standing liquid above the distributor. Thus, depending on column design, the height of the baffle above the distributor is from about 1 inch to about 15 inches.

The baffle extends over the entire cross section of the distributor. Therefore, all liquid, falling from the packing in the liquid-vapor contacting zone above, is collected on the baffle. At least one open space in the baffle allows the liquid to converge, flow through, and then expand as it disperses onto the distributor below, with a consequent improvement in mixing and a dampening of inertial effects. The open space is sized and positioned so that liquid falling at any point on the baffle, from the packing above, will flow in a direction towards the open space. More than one opening in the baffle may comprise the open space but the openings should be located in a localized area to cause the liquid to converge and mix.

The liquid mixes while flowing along to the open space and becomes substantially uniform as the flow converges to pass through the open space. Since the open space in the baffle provides the only flow path for the liquid, and since the baffle extends over essentially the entire cross section of the distributor, all of the liquid flow from the packing above meets and mixes as the liquid flow converges to flow through the open space.

Typically, the baffle is submerged within the standing liquid held up on the distributor but when the liquid level is low the baffle may be completely or partially emerged. Having an open space in the baffle, for liquid to flow through, does not significantly increase the liquid head on the distributor.

In order to maintain the liquid head at the level it was without a baffle, the cross sectional area of the open space is greater than the total area of the perforations in the distributor floor, but is considerably less than the column cross sectional area. The ratio of the cross sectional area of the open space in the baffle to the total open area of the perforations in the distributor floor, is preferably between about 1.1:1 to about 150:1. More preferably the ratio is in the range of about 3:1 to about 20:1. Increasing the ratio reduces the radial velocity of liquid flow over the distributor but also reduces the efficacy of mixing. It is also preferred that the open space of the baffle be highly localized across the column cross section such that liquid from a broad region converges to the open space.

The invention would accomplish similar performance characteristics as when a collector is used in combination with a distributor. A collector with its risers and downcomers is replaced by a baffle made of sheet metal with holes cut in it to fit over the vapor risers of the distributor. This simple construction for a baffle would not require increased column height as with a collector. As a result, the invention also offers the benefit of a significantly reduced capital cost. The invention may also be employed where a liquid-containing feed is introduced to the liquid-vapor contacting column, above the liquid level on the distributor. In summary, the present invention affords the following advantages: 1) reduction in required column height, 2) ease of installation, 3) reduced capital cost, and 4) improved liquid distribution.

An embodiment of the invention, suitable for air separation processes, is shown in FIG. 1. The inner surface 17 of a liquid-vapor contact column wall houses a distributor and a baffle 11 located between two liquid-vapor contacting zones 1. The distributor consists of a perforated floor 3 and vapor risers 16 topped with "hats" 5. A baffle 11 is located at an elevation 12 from the distributor floor 3 and is essentially sealed around the periphery 15 and to gas risers 16 that extend through it. An open space in the form of a circular hole 13 is located in the center of the baffle 11. It should be noted that with some gas riser layouts a central hole may not be possible. In such cases, the hole should be located as close to the center as practically possible.

Liquid flows from the liquid-vapor contacting zone 1 above, to the level of the liquid held up on the distributor 3, above the baffle 11. All liquid above the baffle 11 flows in the direction of the arrows towards the hole 13. As the liquid flow converges and passes through the hole 13, it is well mixed and spreads out as it reaches the distributor floor 3 below. The hole 13 is large enough so that it does not contribute significantly to the head of liquid on the distributor. Liquid builds on the distributor floor to a level at which the rate of liquid flowing out through the perforations is equal to that falling from the liquid-vapor contacting zone 1 above.

Figure 2:
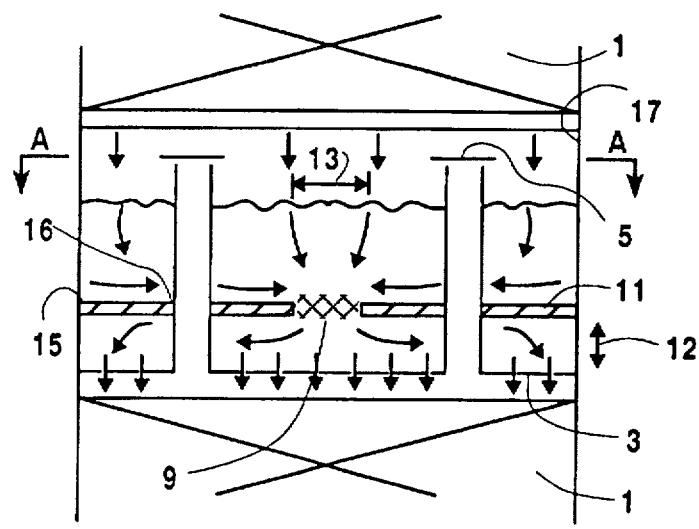
FIG. 2 is diagram of a preferred embodiment of the invention having a mixer located in the centrally located circular open space.

FIG. 2 shows a preferred embodiment of the invention that includes a mixing device 9 within a centrally located open space. The mixing device 9 should be located so as not to interfere with flow through the perforations in the distributor floor directly beneath it and should not require a significant head to drive a liquid flow through it. This mixing device may be a module of structured packing or more preferably a commercially sold mixing device, such as a static mixer. Koch Engineering Company, Inc. is a supplier of suitable static mixers with no moving parts, comprising a series of rigid elements placed lengthwise in a pipe. Intersecting chambers, formed by these elements, split, rearrange and recombine liquid streams until one homogenous stream exists.

The preferred embodiment of FIG. 2 may also be used with a liquid feed or a liquid-containing feed, (i.e. feed may be a mixture of gas and liquid but at least part liquid). The baffle arrangement of the invention ensures proper mixing of the liquid-containing feed with the liquid emanating from the packing above and also dissipates inertial forces associated with a localized feed source, preserving distribution quality.

Figure 3:
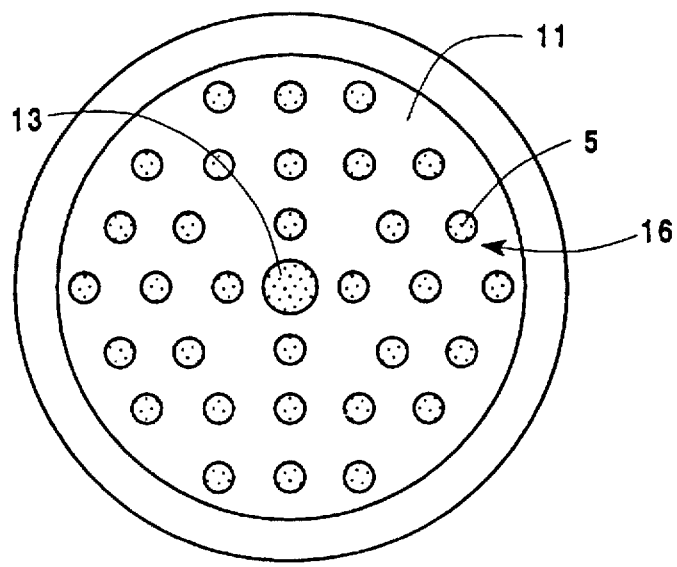
FIG. 3 is a top sectional view along line A—A of FIG. 1.

FIG. 3 shows the plan view from section A—A of FIG. 1. This view shows the baffle 11, the "hats" 5 of a plurality of circular risers 16, and an open space 13 in the center. Though FIG. 2 only shows two circular risers 16 covered by hats 5, several vapor risers are shown for demonstration in this view. The open space is shown to be circular, however, in practice the shape of the open space may be varied to maximize mixing efficiency. For example, a rectangular slot may be used.

Figure 4:
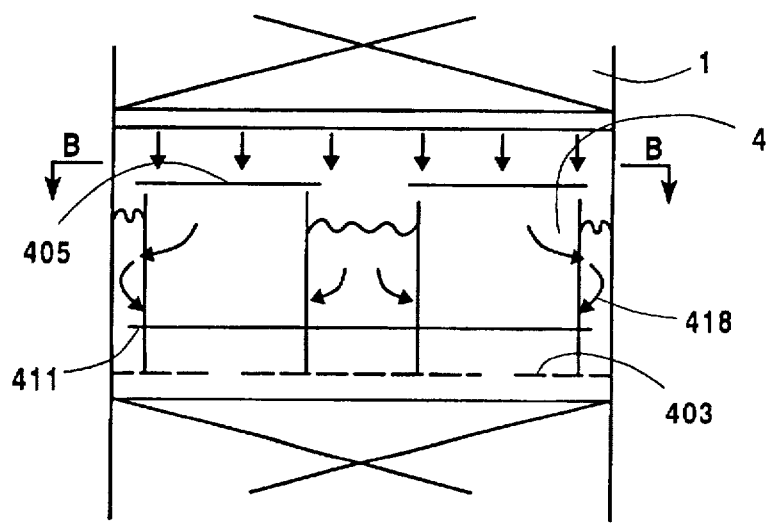
FIG. 4 is a diagram of another embodiment of the invention utilizing a distributor with segmental vapor risers and a baffle having a peripheral open space.

Another embodiment of the invention is shown in FIG. 4. In this figure, the distributor has rectangular vapor risers 416 covered by "hats" 405. The baffle 411 has a peripheral open space 418, rather than a central open space, to disperse liquid falling from the liquid-vapor contacting zone 1 above, to the baffle 411. The liquid flows across the baffle towards the periphery and is mixed as it converges to flow through the open space 418, between the baffle and the column wall. Upon leaving the open space 418, the liquid disperses over the distributor 403 below.

Figure 5:
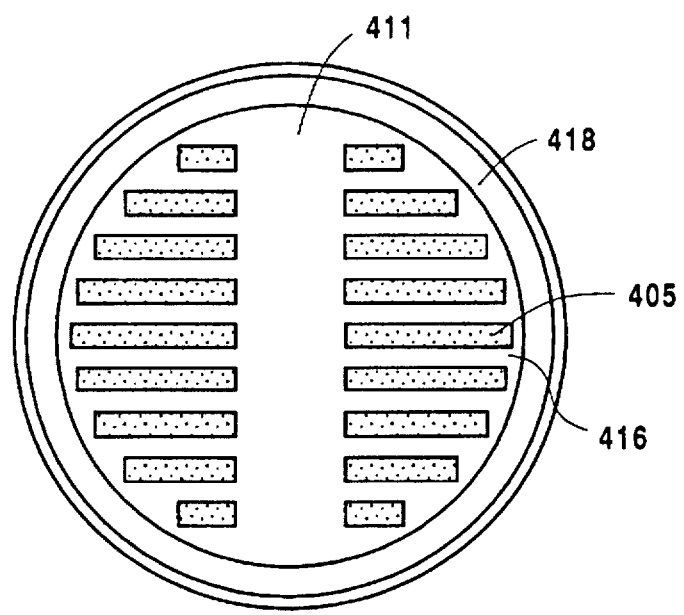
FIG. 5 is a top sectional view along line B—B of FIG. 4.

FIG. 5 shows a plan view B—B of the distributor in FIG. 4 having rectangular vapor risers 416 covered by "hats" 405 and a baffle 411 with peripheral space 418. Baffles with peripheral openings provide a greater cross section for radial flow for the liquid flowing through, than baffles with centrally located openings of the same cross sectional area. As such, the head associated with driving the flow is smaller than a baffle with a central, circular space of the same area. This may result in a superior distribution quality. Such effects may be significant in large distributors where the distance the liquid has to flow radially is large, and with large liquid loads (greater than 10 gpm/ft2) as may be experienced in high pressure columns. Mixing efficiency, however, is compromised when a peripheral opening is used.

As in the embodiment shown in FIG. 6, the baffle 611 may have a weir 688, with a substantially solid wall. The weir forms a passage 622 surrounding the open space 613 in the baffle 611, through which the liquid from the packing must flow after flowing over the top of the weir 688. With a weir, the liquid level is at a level that is higher than it normally would be in the absence of the weir, either during turndown conditions or over the entire range of operation. Such a weir can convert the potential energy associated with the liquid into mixing. By having this weir mounted over the central space of the baffle, it may be designed so that there is only a slight variation in the amount of liquid held up from maximum to minimum flow. The weir may have orifices in its wall to allow liquid to enter laterally and promote mixing.

FIGS. 7 and 8 are embodiments of the invention where more than one baffle is used. The arrangement of FIG. 7 with a top baffle having a central open space and a bottom baffle having a peripheral open space, works well at high and intermediate flows but poorly at low flows where the to baffle is not submerged.

In FIG. 8, a top baffle having a peripheral opening and a bottom baffle with a central hole mixes well at all flows.

The arrangement according to FIGS. 1 and 2 was tested at a 9 inch maximum liquid depth and a 2 inch minimum liquid depth.

Tests were performed on a distributor with the following characteristics:
Distributor diameter=41 inch.
Baffle elevation=2 inch.
Hole location=centered and circular
Diameter of hole=4 inch
Open space ratio*=5
Mixing device=static mixing device
* Open space ratio=ratio of cross sectional area of open space or hole in baffle to total cross sectional area of open space or perforations in distributor floor.

The baffle tested was made of an aluminum sheet and sealed with tape. In practice, either welding or sealant may be employed to seal the baffle.

This arrangement was tested using point source dye trace tests, where dye was injected in the liquid above the distributor and the liquid at the underside of the distributor was observed for coloration as it poured through the perforations in the distributor floor. The result was substantially uniform mixing regardless of where the point source was located above the distributor. This result was in contrast to the result achieved when no baffle was used. In the latter case, less than ¼ of the distributor pour points showed observable discoloration for each point source dye trace test. Even without a mixing element, in testing, a marked improvement was observed using the distributor in conjunction with the baffle of the invention with a central open space.

Better results have been achieved when the baffle is sealed leak tight around the gas risers, and the periphery of the baffle has a central opening. However, it is not absolutely necessary to have a leak-tight seal for the invention to work. Some small drain holes in the distributor may be required to release entrained vapor.

Specific features of the invention are shown in one or more of the drawings for convenience only, as each feature may be combined with other features in accordance with the invention. Alternative embodiments will be recognized by those skilled in the art and are intended to be included within the scope of the claims.

What is claimed is:

1. A method for distributing liquid in a liquid-vapor contacting column having at least two liquid-vapor contacting zones, comprising:

collecting liquid flow from an upper liquid-vapor contacting zone onto a baffle located between the upper liquid-vapor contacting zone and a distributor, said baffle extending substantially over the entire cross section of the distributor such that vapor risers are essentially being sealed around and extending through the baffle for distributing vapors to said upper liquid-vapor contacting zone and the distributor having perforations for enabling liquid to flow through to a lower liquid-vapor contacting zone;

converging the collected liquid flow in an open space in said baffle resulting in substantially uniform mixing of the liquid flow; and dispersing the substantially uniformly mixed liquid flow onto the distributor below.

2. The method of claim 1 wherein the ratio of the cross sectional area of the open space in said baffle to the cross sectional area of the perforations in the distributor is in the range of about 1.1:1 to about 150:1.

3. The method of claim 1, wherein said open space is substantially centrally located within the baffle.

4. The apparatus of claim 3 further comprising a mixing device situated within said open space.

5. The method of claim 1, wherein a liquid-containing feed is introduced to the liquid-vapor contacting column at a location between the baffle and the liquid-vapor contacting zone above.

6. An apparatus for distributing liquid, comprising:

a) a liquid-vapor contacting column having a wall with an inner surface, and at least two vertically spaced liquid-vapor contacting sections including a lower liquid-vapor contacting section and an upper liquid-vapor contacting section;

b) a distributor situated between the liquid-vapor contacting sections having a floor with perforations for distributing liquid to said lower liquid-vapor contacting section and vapor risers for distributing vapor to said upper liquid-vapor contacting section; and c) a baffle suspended above the distributor floor and substantially extending across the entire cross section of the distributor such that said vapor risers essentially being sealed around and extending through said baffle, wherein said baffle defining an open space for converging and mixing liquid from said upper liquid-vapor contacting section before dispersing said liquid onto said distributor.

7. The apparatus of claim 6 wherein said open space is substantially centrally located within the baffle.

8. The apparatus of claim 7 further comprising a mixing device situated within said open space.

9. The apparatus of claim 7 wherein said vapor risers extend through said baffle and said baffle is sealed around said vapor risers and is sealingly connected to the inner surface of said liquid-vapor contacting column.

10. The apparatus of claim 6 wherein the ratio of the cross sectional area of said open space in said baffle to the cross sectional area of the perforations in the distributor is in the range of about 1.1:1 to about 150:1.

11. The apparatus of claim 6 wherein said open space is peripherally located between said baffle and said inner column wall such that liquid flows to the periphery of the baffle where it converges and mixes as it passes through the open space.

12. The apparatus of claim 6 further comprising a second baffle such that one of said baffles is suspended above the other of said baffles and the open space in one of said baffles is located in a position that is not aligned with the open space in the other of said baffles.

13. The apparatus of claim 6 further comprising a weir surrounding said open space in said baffle and forming a passage, such that liquid must flow over the weir and down through the passage formed by the weir before expanding on the underside of said baffle, resulting in improved mixing.

14. A baffle for mixing liquid to be dispersed onto a distributor of a liquid-vapor contacting column comprising:

a metal sheet extendable over substantially the entire cross section of the column and having apertures tightly fittable around gas risers of the distributor;

said metal sheet being suspendable above the distributor floor; and said metal sheet defining an open space for causing a liquid flow over said baffle to converge and mix as said liquid flow passes through the open space and disperses onto the distributor below.

15. The baffle of claim 14 wherein said open space is substantially centrally located within the baffle.

16. The baffle of claim 14 further comprising a mixing device situated within said open space.

* * * * *